United States Patent [19]

Tabata et al.

[11] Patent Number: 4,708,329
[45] Date of Patent: Nov. 24, 1987

[54] FLUID-FILLED POWER UNIT MOUNT DEVICE

[75] Inventors: Toshiyuki Tabata, Sagamihara; Hiroshi Aikawa, Atsugi; Yoshinari Fujiwara, Yachiyo; Norio Yoda, Yotsukaido, all of Japan

[73] Assignees: Nissan Motor Co., Ltd., Yokohama; Kinugawa Rubber Ind. Co., Ltd., Chiba, both of Japan

[21] Appl. No.: 935,108

[22] Filed: Nov. 24, 1986

Related U.S. Application Data

[63] Continuation of Ser. No. 705,932, Feb. 26, 1985, abandoned.

[30] Foreign Application Priority Data

Feb. 27, 1984 [JP] Japan .................................. 59-34296

[51] Int. Cl.$^4$ .......................... F16F 13/00; F16F 9/08; B60K 5/12
[52] U.S. Cl. ................................ 267/140.1; 248/562; 248/636; 267/219
[58] Field of Search ............... 267/140.1, 35, 63, 122, 267/123, 9 R, 113, 8 R; 248/562, 536, 636, 634, 563; 188/322.13, 322.14, 322.15, 378, 379, 298

[56] References Cited

U.S. PATENT DOCUMENTS

| 4,159,091 | 6/1979 | Le Salver et al. ............ 248/634 X |
| 4,262,886 | 4/1981 | Le Salver et al. ....................... 267/8 |
| 4,383,679 | 5/1983 | Kakimoto ........................ 248/562 X |
| 4,458,888 | 7/1984 | Wolf et al. ........................ 267/140.1 |
| 4,645,188 | 2/1987 | Jordens ........................... 267/140.1 |
| 4,645,189 | 2/1987 | Quast ................................ 267/140.1 |

FOREIGN PATENT DOCUMENTS

| 0040290 | 11/1981 | European Pat. Off. . |
| 0042761 | 12/1981 | European Pat. Off. . |
| 0058408 | 8/1982 | European Pat. Off. . |
| 98330 | 1/1984 | European Pat. Off. .............. 267/35 |
| 0115417 | 8/1984 | European Pat. Off. . |
| 2659844 | 11/1977 | Fed. Rep. of Germany ... 267/140.1 |
| 2727244 | 1/1978 | Fed. Rep. of Germany . |
| 3142673 | 5/1983 | Fed. Rep. of Germany ... 267/140.1 |
| 5549 | 1/1983 | Japan ................................ 267/140.1 |
| 2041488 | 9/1980 | United Kingdom . |
| 2068079 | 8/1981 | United Kingdom ............. 267/140.1 |

Primary Examiner—Douglas C. Butler
Attorney, Agent, or Firm—Schwartz, Jeffery, Schwaab, Mack, Blumenthal & Evans

[57] ABSTRACT

A fluid-filled power unit mount device consists of a mount rubber securely interposed between two base plates. A partition plate is securely connected to one of the base plate so as to define fluid and auxiliary chambers on the opposite sides thereof. The partition plate is formed with an orifice to provide fluid communication between the fluid and auxiliary chambers, and provided with two parallely arranged movable mechanisms each having a movable member. The movable member is movable under small amplitude high frequency vibration causing booming noise, but restrained from its movement under large amplitude low frequency vibration, thereby effectively damping even vibration which is slightly higher in frequency than the booming noise generating high frequency vibration.

29 Claims, 9 Drawing Figures

FLUID-FILLED POWER UNIT MOUNT DEVICE

This application is a continuation of application Ser. No. 705,932 filed Feb. 26, 1985, now abandoned.

BACKGROUND OF THE INVENTION

1. Field of the Invention

This invention relates to improvements in fluid-filled power unit mount devices for elastically supporting a power unit on a vehicle body, and more particularly to the power unit mount devices provided with a device intended to exhibit greater vibration damping effect throughout all power unit operating ranges.

2. Description of Prior Art

Power unit mount devices filled with a fluid have been used extensively for elastically supporting a power unit such as an automotive internal combustion engine on a vehicle body. A variety of types of fluid-filled power unit mount devices have been proposed including one which is provided with a movable partition plate structure which is so located as to divide a cavity of a mount rubber into fluid and auxiliary chambers both filled with a fluid. The partition plate structure is formed with an orifice through which the fluid and auxiliary chambers are fluidly communicable with each other. In such a type of fluid-filled power unit mount device, a vibration damping effect is obtained for large amplitude vibration in a lower frequency range (about 5-13 Hz) by virtue of resonance vibration of the fluid mass within the orifice, and for small amplitude vibration in a high frequecy range (for example, 100-170 Hz) in which booming noise is generated by virtue of the vibration of the partition plate structure. However, the partition plate structure cannot move under vibration in a frequency range (for example, 250-300 Hz) slightly higher than the booming noise generating frequency range, thus considerably raising the dynamic spring constant of the power unit mount device as a whole. This allows high frequency fine vibration due to combustion in the power unit to be transmitted from the power unit to the vehicle body.

SUMMARY OF THE INVENTION

A fluid-filled power unit mount device of the present invention comprises a mount rubber securely interposed between a first base plate on a power unit side and a second base plate on a vehicle body side. A partition plate is securely connected to the second base plate member to define fluid and auxiliary chambers on the opposite sides thereof. The partition plate is formed with at least one orifice through which the fluid and auxiliary chambers are fluidly communicated with each other. The partition plate is further provided with first and second movable mechanisms having first and second movable members, respectively. The first and second movable members are movable upon receiving small amplitude high frequency vibration, but restrained from its movement upon receiving large amplitude low frequency vibration.

Accordingly, vibration damping effect can be obtained to the large amplitude low frequency vibration causing engine shake by virtue of the orifice, while to small amplitude high frequency vibration causing booming noise by virtue of the movable mechanisms which function to maintain the dynamic spring constant of the power unit mount device as a whole within a certain lower range. Additionally, good vibration damping effect can be obtained even in a damping effect deterioration region in which vibration slightly higher in frequency than the small amplitude high frequency vibration is applied, by virtue of combined effect of the first and second movable mechanisms in which conspicuous rise of the dynamic spring constant of the mount device can be avoided.

BRIEF DESCRIPTION OF THE DRAWINGS

The features and advantages of the power unit mount device of the present invention will be more clearly appreciated from the following description taken in conjunction with the accompanying drawings in which the same reference numerals designate same elements and parts, and in which.

DETAILED DESCRIPTION OF THE INVENTION

Figure 1:
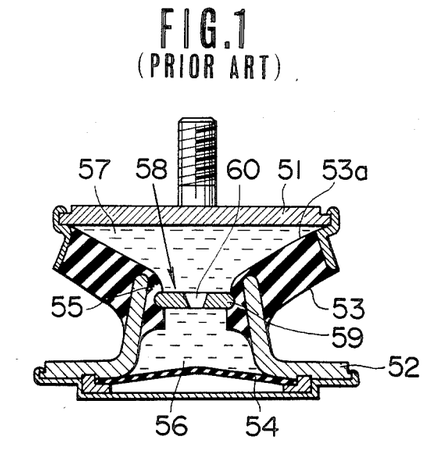
FIG. 1 is a vertical sectional view of a conventional power unit mount device.

To facilitate understanding of the present invention, a brief reference will be made to a conventional fluid-filled power unit mount device, depicted in FIG. 1. Such a fluid-filled power unit mount device is, for example, disclosed in Japanese Patent Provisional (First) Publication No. 58-72740. Referring to FIG. 1, the conventional power unit mount device includes a mount rubber 53 which is securely interposed between a base plate 51 on a power unit side and a base plate 52 on a vehicle body side. The mount rubber 53 is formed therein with an inner space 53a filled with a fluid. A diaphragm 54 and a partition plate structure 55 is fixedly connected to the base plate 52 thereby to define an auxiliary chamber 56 between the partition plate structure 55 and the diaphragm 54. Additionally, the partition plate structure 55 defines a fluid chamber 57 between it and the base plate 51. The partition plate structure 55 includes a valve or movable mechanism 58 which is movable under large amplitude high frequency vibration and restrained from its movement under large amplitude low frequency vibration. The valve mechanism 58 has a movable plate 59 which is formed with an orifice 60 through which the fluid chamber 57 and the auxiliary chamber 56 are communicated with each other.

Such a conventional power unit mount device is configured to function as follows: To relatively large amplitude vibration in a low frequency range, damping force can be obtained upon resonance in which the fluid within the orifice serves as a mass; and to relatively small amplitude vibration in a high frequency range, damping can be accomplished by suppressing the value of the dynamic spring constant of the whole power unit mount device at a predetermined range upon movement of the movable member 59 of the valve mechanism 58. Accordingly, the engine mount device is set such that engine shake generated at a resonance frequency (for example, of 5–13 Hz) is prevented by providing the orifice 60 with high damping force, and booming noise is prevented from being generated by the valve mechanism 58 which makes its resonance at a frequency slightly higher than levels of 100–170 Hz at which the booming noise is generated.

However, in the thus set power unit mount device, if the dynamic spring constant of the whole engine mount device at a frequency range of 100–170 Hz is lowered in order to prevent booming noise generation, the valve mechanism 58 cannot smoothly function at a higher frequency range (for example, of 250–300 Hz) higher than the range of 100–170 Hz because of exceeding the resonance point of the valve mechanism 58, thereby providing a damping effect deterioration region in which the value of dynamic spring constant of the the whole engine mount device considerably rises. The thus rising dynamic spring constant causes high frequency fine vibration due to combustion in an engine to be readily transmitted from the engine to a vehicle body.

Now, the valve mechanism 58 constitutes a spring system whose resonance frequency $f_0$ is expressed by the following equation:

$$f_0 = \frac{1}{2\pi} \sqrt{\frac{K}{m^*}}$$

where, $m^*$ is the equivalent mass of the fluid, and K is the sum of the rigidities of the diaphragm and the mount rubber. The equivalent mass $m^*$ is expressed by the following equation:

$$m^* = m_0 \left(\frac{A_1}{A_2}\right)^2$$

where, $A_1$ is the cross-sectional area of the inner space of the mount rubber; $A_2$ is the effective area of the valve mechanism; and $m_0$ is the mass of the fluid moving around the valve mechanism under fine vibration.

Figure 2:
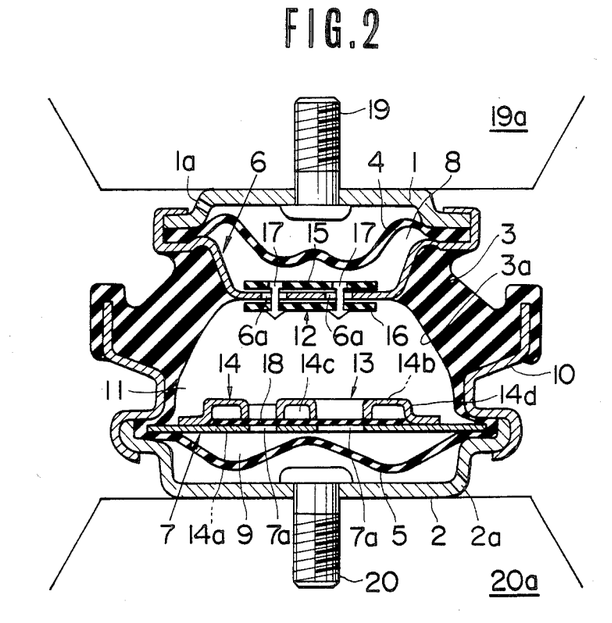
FIG. 2 is a vertical sectional view of a first embodiment of a power unit mount device in accordance with the present invention.

In view of the above description of the conventional power unit mount device, reference is now made to FIG. 2, wherein a first embodiment of a fluid-filled power unit mount device of the present invention is illustrated. The power unit mount device comprises an elastomeric block or mount rubber 3 which is securedly interposed between a base plate 1 on a power unit side and a base plate 2 on a vehicle body side. The mount rubber 3 is formed therein with an inner space or cavity 3a. A diaphragm 4 and a partition plate 6 are securely connected to the base plate 1. A diaphragm 5 and a partition plate 7 are securely connected to the base plate 2. A first auxiliary chamber 8 is defined between the diaphragm 4 and the partition plate 6. A second auxiliary chamber 9 is defined between the diaphragm 5 and the partition plate 7.

More specifically, the mount rubber 3 is securely connected or bonded at its upper section to the partition plate 6 and at its lower section to a generally annular support plate 10 by means of adhesion due to vulcanization. The partition plate 6 is bent inside at its outer peripheral section and secured onto the base plate 1, in which the outer peripheral section of the diaphragm 4 is securely positioned between the partition plate 6 and the base plate 1. The support plate 10 is bent inside at its lower section and secured to the base plate 2, in which the outer peripheral section of the diaphragm 5 is securely positioned between the support plate 10 and the base plate 2. A fluid chamber 11 is defined between the partition plate 6 and the partition plate 7. An incompressible fluid such as water or oil is filled in the chambers 8, 9, 11.

The partition plate 6 is provided with a first movable or valve mechanism 12 which is movable under fine or small amplitude vibration in a predetermined high frequency range (for example, of 100–170 Hz), and restrained in its movement under large amplitude vibration in a predetermined low frequency range (for example, of 5–13 Hz). The partition plate 7 is provided with a second movable or valve mechanism 13 which functions in the same manner as in the first movable mechanism, and an orifice device 14, as a flow passage with orifice, through which the fluid chamber 11 and the second auxiliary chamber 9 are communicated with each other. The first movable mechanism 12 includes upper and lower plates 15, 16 which are formed of elastic or elastomeric material and disposed on the opposite sides of the partition plate 6. The upper and lower plates 15, 16 are connected with each other by connecting rods 17 which are loosely inserted in through-holes 6a of the partition plate 6. The upper and lower plates 15, 16 are so locatable as to be spaced from the opposed side surfaces of the partition plate 6, respectively.

Figure 3:
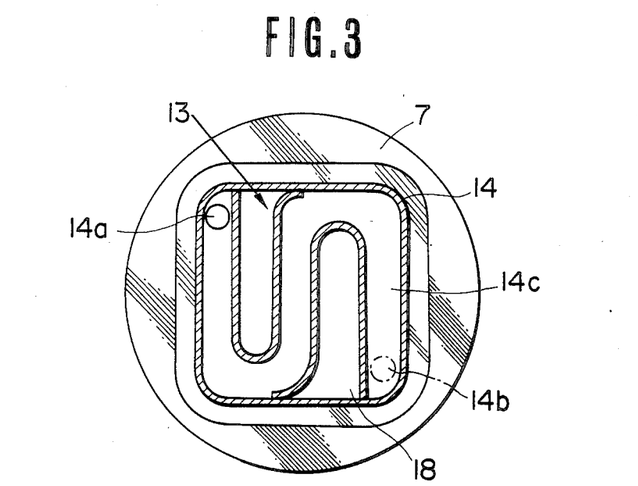
FIG. 3 is a plan view, partly in section, of a partition plate forming part of the power unit mount device of FIG. 2.

The second movable mechanism 13 includes a flexible diaphragm-shaped member 18 formed of an elastomeric material (such as rubber or elastomer) in which fibrous material is embedded. The flexible member 18 is securely attached or bonded to the partition plate 7 in such a manner to cover openings 7a. Additionally, the orifice device 14 includes a flow passage defining member 14d which is secured to the partition plate 7 and in tight contact with the flexible member 18 thereby to define a fluid flow passage 14c generally around the openings 7a. The fluid flow passage 14c is communicated at one end thereof with the second auxiliary chamber 9 through an orifice 14a and at the other end thereof with the fluid chamber 11 through an orifice 14b as shown in FIG. 3. The orifice 14a is formed through the flexible member 18 and the partition plate 7. The orifice 14b is formed through the top wall of the flow passage defining member 14d. As shown, the fluid flow passage 14c is S-shaped so as to have a predetermined larger volume.

The base plate 1 is formed with an air vent 1a, and securely provided with a bolt 19 by which the base plate 1 is installed to the power unit 19a. The base plate 2 is formed with an air vent 2a, and securely provided with a bolt 20 by which the base plate 2 is installed to the vehicle body 20a. It is to be noted that a vibration frequency $f_1$ at which the orifice device 14 exhibits the maximum value of damping ability depends on the equivalent mass of the fluid within the orifice device 14 and on the cross-sectional area of the orifice device 14, i.e., the diameters of the orifices 14a and 14b located at opposite ends of the fluid flow passage 14c. A variety of experiments conducted by the present inventors et al revealed that the frequency $f_1$ decreased as the equivalent mass increased and as the diameter of the orifices decreased. Furthermore, it was also revealed that the damping ability increased as the diameter of the orifices increased.

The manner of operation of the thus configured power unit mount device will be discussed hereinafter.

When the large amplitude vibration in the low frequency range (for example, of 5-13 Hz) in which engine shake occurs is input to the base plate 1, the mount rubber 3 is largely extended and contracted thereby to cause a volume change of the fluid chamber 11. As a result, the upper or lower plates 15, 16 of the first movable mechanism 12 are brought into close contact with the partition plate 6, and then the flexible member 18 is fixed to the openings 7a of the partition plate 7 by virtue of tensile force of the fiber material contained therein after making a predetermined elastic deformation. Thus, the first and second movable mechanisms 12, 13 are restrained from their movement, so that the fluid mass within the orifice device 14 makes its resonance vibration, thereby generating a greater damping force.

Furthermore, since the fluid flow passage 14c of the orifice device 14 has a relatively large volume and a cross-sectional area larger than that of the orifices 14a, 14b, the frequency $f_1$ at which the maximum damping ability is exhibited can be set at a predetermined frequency in a relatively low frequency range even in case the diameter of the orifices 14a, 14b are relatively enlarged. Additionally, it is possible to set the diameter of the orifices 14a, 14b larger, thereby raising the damping ability.

When the small amplitude vibration in a high frequency range (for example, of 100-170 Hz) in which booming noise is generated is input, the fluid cannot flow through the orifice device 14 because the speed of pressure change within the fluid chamber 11 is higher, so that the fluid is confined in the fluid chamber 11. At this time, the mount rubber 3 extends and contracts, and the first and second movable mechanisms 12, 13 function in which the upper and lower plates 15, 16 of the first movable mechanism 12 moves upward and downward while the flexible member 18 extends and contracts, thereby lowering the value of dynamic spring constant of the whole power unit mount device. This suppresses the transmission of small amplitude vibration from the power unit to the vehicle body. More specifically, since a high damping effect is obtained in the low frequency range by virtue of the orifice device 14, it is possible to set the value of static spring constant of the mount rubber 3 at a low value as compared with a conventional engine mount device consisting of a single mount rubber. This can lower the value of dynamic spring constant of the mount rubber 3 in the high frequency range (for example, of 100-170 Hz) under cooperation of the effect of the first and second movable mechanisms 12, 13.

In a damping effect deterioration region in which the value of dynamic spring constant of the whole engine mount device rises in a higher frequency range (for example, of 250-300 Hz) slightly higher than the above-mentioned high frequency range in which booming noise is generated, the damping effect deterioration of the power unit mount device can be suppressed lower under the combined effects of the first and second movable mechanisms 12, 13 which are parallely arranged.

Since the resonance frequency $f_0$ of each movable mechanism 12, 13 is expressed by an equation of $$f_0 \propto \sqrt{\frac{K}{m^*}},$$

it is facilitated to set the resonance frequency $f_0$ of each movable mechanism 12, 13 at a predetermined value by varying the value of K upon varying the rigidity of each diaphragm 4, 5 in case a plurality of auxiliary chambers 8, 9 are defined by a plurality of diaphragms 4, 5.

Figure 4:
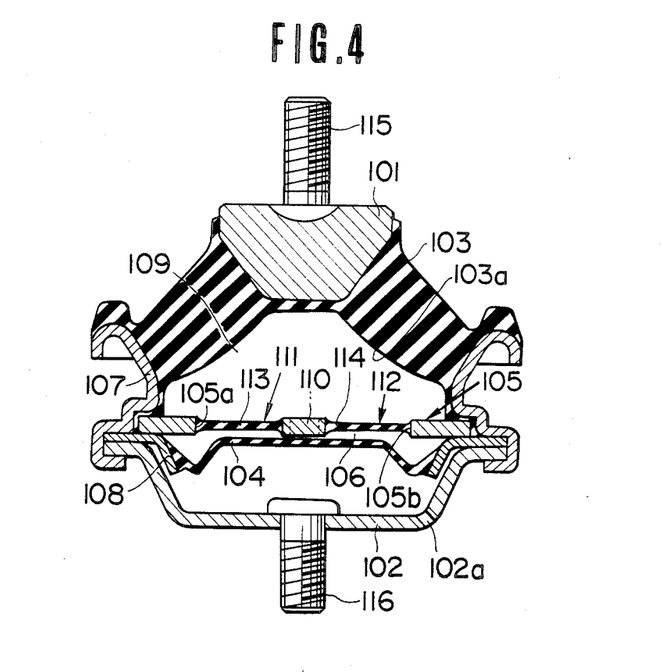
FIG. 4 is a vertical sectional view of a second embodiment of the power unit mount device in accordance with the present invention.

FIG. 4 illustrates a second embodiment of the engine mount device of the present invention. In this embodiment, an elastomeric block or mount rubber 103 is securely interposed between a base plate 101 on the power unit side and a base plate 102 on the vehicle body side. The mount rubber 103 is formed with an inner space or cavity 103a filled with the incompressible fluid. A diaphragm 104 and a partition plate 105 are securely connected to the base plate 102 in such a manner as to define an auxiliary chamber 106 between the diaphragm 104 and the partition plate 105. More specifically, the mount rubber 103 is securely connected or bonded at its upper section to the base plate 101 and at its lower section to a generally annular support plate 107 by means of adhesion due to vulcanization. The support plate 107 is bent inside at its lower section to be secured to the base plate 102, in which the outer peripheral sections of the partition plate 105 and an annular member 108 are fixedly positioned between the support plate 107 and the base plate 102 which are incorporated with each other. The diaphragm 104 is securely attached or bonded at its outer periphery to the inner peripheral section of the annular member 108 by means of adhesion due to vulcanization. A fluid chamber 109 is defined between the partition plate 105 and the base plate 101. The incompressible fluid is filled in the chamber 109 and the auxiliary chamber 106.

Figure 5:
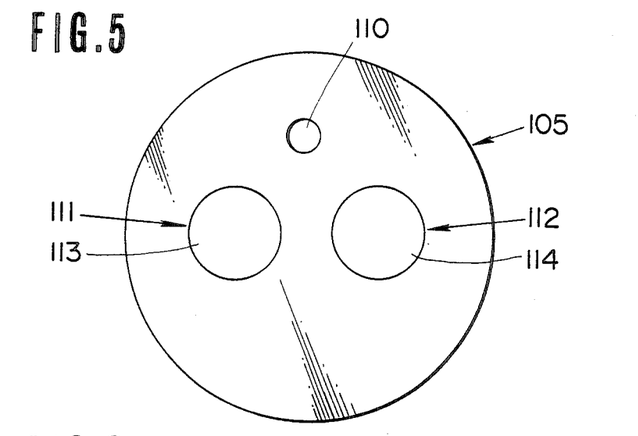
FIG. 5 is a plan view of a partition plate forms part of the power unit mount device of FIG. 4.

The partition plate 105 is provided with an orifice 110 through which the fluid chamber 109 and the auxiliary chamber 106 are communicated with each other. The partition plate 105 is further provided with first and second movable or valve mechanisms 111, 112 each of which is movable under the small amplitude vibration in the predetermined high frequency range and restrained from movement under large amplitude vibration in the predetermined low frequency range. The first movable mechanism 111 includes a flexible diaphragm-shaped member 113 formed of the elastomeric material in which the fibrous material is embedded. The flexible member 113 is bonded to the inner peripheral surface of an opening 105a formed through the partition plate 105 as shown in FIG. 5. The second movable mechanism 112 has the same structure as the first movable mechanism 111 and accordingly includes a flexible diaphragm-shaped member 114 which is the same as the flexible member 113. The flexible member 114 is bonded to the inner peripheral surface of an opening 105b formed through the partition plate 105. Additionally, the orifice 110 is formed as a through-hole in the partition plate 105 as shown in FIG. 5. The base plate 101 is provided with a bolt 115 by which the base plate is installed to the power unit. The base plate 102 is formed with an air vent 102a and provided with a bolt 116 by which the base plate is installed to the vehicle body.

With the thus configurated second embodiment engine mount device, the orifice 110 exhibits the same effect obtained by the conventional engine mount device as shown in FIG. 1, thereby effectively damping the large amplitude vibration in the predetermined low frequency range. However, the first and second movable mechanisms 111, 112 function in the same manner as the first and second movable mechanisms 12 and 13, thereby exhibiting high damping action on the small amplitude vibration in the high frequency range (for example, of 100-170 Hz) in which booming noise is generated and on the smaller amplitude vibration in the frequency range (for example, about 250-300 Hz) slightly higher than the booming noise generating high frequency range under the combined effects of the first and second movable mechanisms 111, 112.

Figure 9:
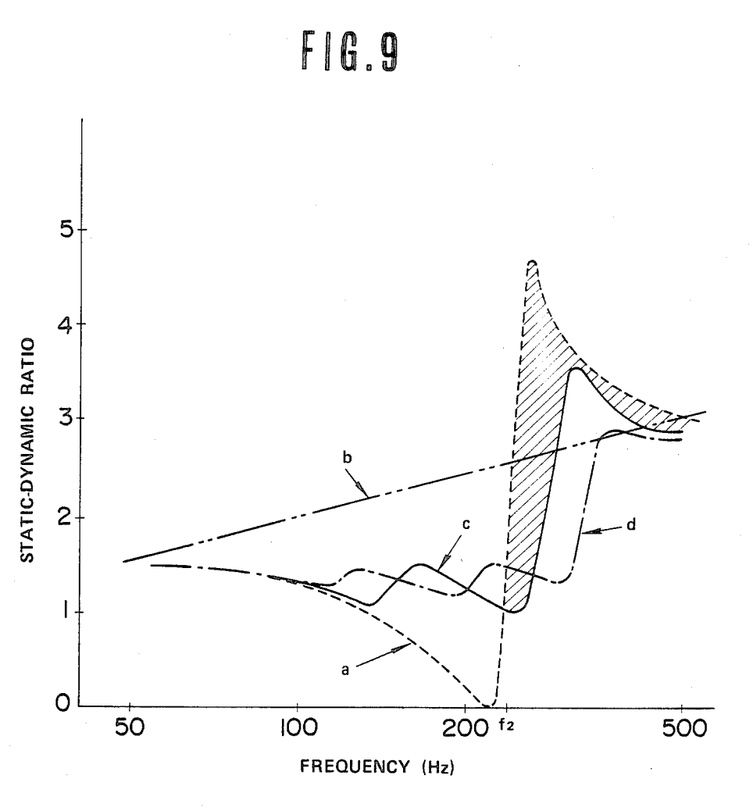
FIG. 9 is a graph showing the characteristics of the second embodiment of the power unit mount device in terms of the relationship between static-dynamic ratio and frequency.

This damping effect will be discussed in detail with reference to the test result of FIG. 9. In FIG. 9 the ordinate axis is the dynamic-static ratio (dynamic spring constant/static spring constant) whereas the abscissa axis is frequency in Hz, a line a indicates the characteristics of the conventional power unit mount device as shown in FIG. 1, a line b that of a conventional power unit mount device consists consisting of a single mount rubber, and a line c that of the second embodiment power unit mount device shown in FIGS. 4 and 5.

The graph of FIG. 9 reveals the fact that the value of the dynamic spring constant of the second embodiment power unit mount device can be maintained within a certain range under vibration in the frequency range of 100-170 Hz, and additionally a conspicuos increase in dynamic spring constant of the same can be suppressed in a frequency range higher than a resonance frequency $f_2$ of the characteristics of the line a. This can suppress the transmission of the small amplitude vibration in the high frequency range of about 250-300 Hz to the vehicle body, while lowering the value of dynamic spring constant. Since the resonance frequency $f_0$ is expressed by the equation $$f_0 \propto \sqrt{\frac{K}{m^*}},$$

it is freely selectable upon changing the diameter and the rigidity of each flexible member 113, 114 and the rigidity of the diaphragm member 104. Turning again to FIG. 9, a line d indicates the characteristics of a power unit mount device similar to that of FIGS. 4 and 5 except that the partition plate 105 is provided with three movable mechanisms which are arranged in parallel, in which the maximum value of the dynamic spring constant further lowers and shifts toward high frequency side.

Figure 6:
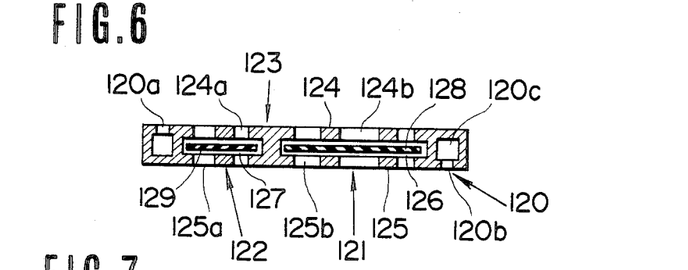
FIG. 6 is a vertical sectional view of an example of a partition plate useable in place of the partition plate of FIG. 5.

FIG. 6 shows an example of a partition plate 123 which is usable in place of the partition plate 105 of the second embodiment power unit mount device shown in FIGS. 4 and 5. The partition plate 123 is provided with an orifice device 120, and first and second movable mechanisms 121, 122 which are arranged in parallel. The partition plate 123 is formed at its peripheral section with an annular fluid flow passage 120c which forms a middle part of the orifice device 120. An end portion of the fluid flow passage 120c is opened through the orifice 120a to the one side surface of the partition plate 123. The other end portion of the fluid flow passage 120c is opened through an orifice 120b to the other side surface of the partition plate 123. The partition plate 123 is formed at its central section with right and left chambers or spaces 126, 127 which are separated from each other. The right and left chambers 126, 127 are defined between upper and lower plate sections 124, 125 which form part of the wall of the partition plate 123. The upper plate section 124 is formed with a plurality of through-holes 124a merging in the left chamber 127, and a plurality of through-holes 124b merging in the right chamber 126. The lower plate section 125 is formed with a plurality of through-holes 125a merging in the left chamber 127, and a plurality of through-holes 125b merging in the right chamber 126. A movable plate 128 formed of an elastic or elastomeric material is loosely disposed within the right chamber 126 thereby constituting the first movable mechanism 121. A movable plate 129 made of the elastic or elastomeric material is loosely disposed within the left chamber 127 thereby constituting the second movable mechanism 122. It will understood that the upper and lower plate sections 124, 125 serve as stoppers for the movable plates 128, 129. Thus, the first and second movable mechanisms 121, 122 are arranged in parallel to function in such a manner that they are movable under the small amplitude vibration in the predetermined high frequency range and restricted from its movement under the large amplitude vibration in the predetermined low frequency range.

In case the partition plate 123 is used in place of the partition plate 105 of the second embodiment power unit mount device of FIGS. 4 and 5, the movable plates 128, 129 move between the upper and lower plate sections 124, 125 under the small amplitude vibration in the predetermined high frequency range, while the plates 128, 129 are biased against the upper or lower plate section 124, 125 to be restrained from movement, thus obtaining the same effect as in the second embodiment power unit mount device. In addition, since the fluid flow passage 120c connecting the orifices 120a, 120b has a cross-sectional area larger than that of the orifices 120a, 120b, it is possible to set relatively larger the diameter of the orifices 120a, 120b thereby to obtain high damping effect to low frequency vibration by virtue of the action of fluid mass within the fluid flow passage 120c. It will be understood that the movable plates 128, 129 may be formed of the elastomeric material such as rubber or elastomer since they are supported throughout their wide surface by the solid or wall portion of the upper and lower plate sections 124, 125.

Figure 7:
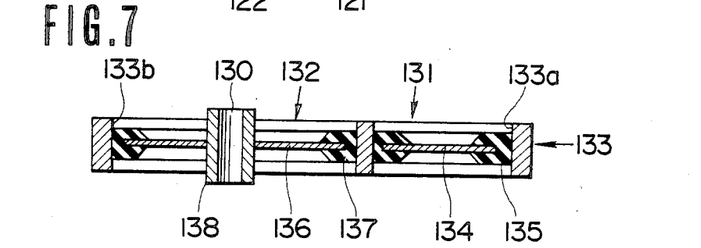
FIG. 7 is a vertical sectional view similar to FIG. 6, but showing another example of the partition plate useable in place of the partition plate of FIG. 5.

FIG. 7 shows another example of a partition plate 133 useable in place of the partition plate 105 of the second embodiment power unit mount device shown in FIGS. 4 and 5. The partition plate 133 is provided with an orifice 130, and first and second movable mechanisms 131, 132 which are parallelly arranged. The partition plate 133 is formed with two openings 133a, 133b which are different in diameter. A plate member 134 is disposed in the opening 133a in such a manner that its peripheral section is securely connected to an elastic annular member 135 fixedly disposed in the opening 133a, thus constituting the first movable mechanism 131 in which the plate member 134 is movable upward and downward. A plate member 136 is disposed in the opening 133b in such a manner that its peripheral section is securely connected to an elastic annular member 135 fixedly disposed in the opening 133b, thus constituting the second movable mechanism 132 in which the plate member 136 is movable upward and downward. The plate member 136 carries a pipe member through which an orifice 130 is formed.

In case the partition plate 133 is installed in place of the partition plate of 105 of the second embodiment power unit mount device of FIGS. 4 and 5, the the plate members 134, 136 move within an elastically deformable range of the annular elastic members 135, 137, respectively, under fine or small amplitude vibration in the predetermined high frequency range, and is restrained from its movement by the annular elastic members 135, 137, respectively, under the large amplitude vibration in the predetermined low frequency range. It will be understood that damping effect can be obtained by virtue of the orifice 130 under such large amplitude high frequency vibration. Thus, the power unit mount device provided with the partition plate 133 functions same as the second embodiment power unit mount device.

Figure 8:
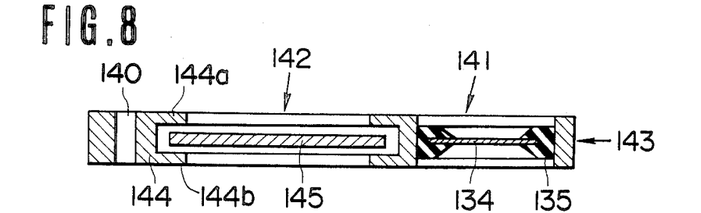
FIG. 8 is a vertical sectional view similar to FIG. 6, but showing a further example of the partition plate useable in place of the partition plate of FIG. 5.

FIG. 8 shows a further example of a partition plate 143 useable in place of the partition plate 105 of the second embodiment power unit mount device. The partition plate 143 is provided with a first movable mechanism 141 which is substantially the same as the first movable mechanism 131 of the partition plate 133 of FIG. 7 and functions the same as the mechanism 131. The partition plate 143 is further provided with a second movable mechanism 142 which includes a movable plate 145 loosely disposed in a chamber or space (no numeral) defined between upper and lower plate sections 144a, 144b serving as stoppers for the movable plate 145. Additionally, an orifice 140 is formed through the wall of the partition plate 143.

In case this partition plate 143 is installed in place of the partition plate 105 of the second embodiment power unit mount device, the movable plate 145 moves between the upper and lower plate sections 144a, 144b under the small amplitude vibration in the predetermined high frequency range and are restrained from movement against the upper or lower plate sections 144a, 144b under the large amplitude vibration in the predetermined low frequency vibration. It will be understood that the orifice 140 exhibits damping effect under such large amplitude low frequency vibration.

It will be appreciated that, in order to obtain good damping effect, each first movable mechanism 12, 111, 121, 131, 141 and each second movable mechanism 13, 112, 122, 132, 142 may be set to have resonance frequencies $f_3$ and $f_4$, respectively, in which the resonance frequency $f_3$ is within a high frequency range (for example, of about 100–170 Hz) in which booming noise is generated whereas the resonance frequency $f_4$ is of within the damping effect deterioration region or in the higher frequency range (for example, of about 250–300 Hz) in which the dynamic spring constant rises.

What is claimed is:
1. A fluid-filled power unit mount device comprising:
   first and second base plates which are spaced from one another and securely connected to a vehicle body and a power unit, respectively;
   an elastic block securely interposed between said first and second base plates and being formed therein with a cavity;
   a first diaphragm fixed to said first base plate;
   a first partition plate fixed to said first base plate, said first diaphragm being disposed between said first base plate and said first partition plate, said first partition plate defining a fluid chamber in said elastic block cavity, and said first diaphragm and said first partition plate defining a first auxiliary chamber, said fluid and auxiliary chambers being filled with a fluid and located on opposite sides of said first partition plate;
   a first movable mechanism having a first movable member and being incorporated with said first partition plate, and a second movable mechanism positioned in said elastic block cavity and including a second movable member, said first and second movable members being independent and separate from each other to be independently movable, said first movable mechanism further having a first side in contact with the fluid in said fluid chamber, and a second side in contact with the fluid within said first auxiliary chamber, said first and second movable members being in contact with the fluid in said fluid chamber and movable through the fluid under the first vibration in a first frequency range and being restrained from movement through the fluid under second vibration in a second frequency range which is lower than said first frequency range, said first vibration including first higher frequency vibration in a freqency range of from 250 Hz to 300 Hz, and a first lower frequency vibration in a frequency range of from 100 Hz to 170 Hz, said first movable member being movable under said first lower frequency vibration; and
   means defining at least one orifice formed in said first partition plate to establish fluid communication between said fluid and first auxiliary chambers.

2. A fluid-filled power unit mount device as claimed in claim 1, further comprising a second diaphragm securely connected to said second base plate, and a second partition plate securely connected to said second base plate, said second movable mechanism being positioned against said second partition plate, said second diaphragm being disposed between said second partition plate and said second base plate, a second auxiliary chamber being defined between said second partition plate and said second diaphragm, said second auxiliary chamber being located opposite to said fluid chamber with respect to said second partition plate.

3. A fluid-filled power unit mount device as claimed in claim 2, wherein said second movable member includes first and second flexible diaphragm members, covering first and second openings formed through said second partition plate, each flexible diaphragm member containing therein fibrous material.

4. A fluid-filled power unit mount device as claimed in claim 3, wherein said first and second flexible diaphragm members are integral with each other to form a single flexible diaphragm member.

5. A fluid-filled power unit mount device as claimed in claim 2, wherein said first movable member includes a first plate movably disposed within said first auxiliary chamber, a second plate movably disposed within said fluid chamber, a plurality of connecting rods for so connecting said first and second plates that said first and second plates are separable from said first partition plate, said connecting rods being loosely and movably disposed in a plurality of openings, respectively, formed though said first partition plate, said first auxiliary chamber being fluidly communicable through said openings with said fluid chamber.

6. A fluid-filled power unit mount device as claimed in claim 2, further comprising means defining a fluid flow passage incorporated with said second partition plate and located on a side of said second partition plate facing said fluid chamber, said fluid flow passage having a first end section communicated through a first orifice with said second auxiliary chamber, and a second end section communicated through a second orifice with said fluid chamber.

7. A fluid-filled power unit mount device as claimed in claim 6, wherein said fluid flow passage is larger in cross-sectional area than either of said orifices.

8. A fluid-filled power unit mount device comprising:
first and second base plates which are spaced from each other and securely connected to a vehicle body and a power unit, respectively;
an elastic block securely interposed between said first and second base plates and being formed therein with a cavity;
a diaphragm fixed between said first and second base plates;
a partition plate fixed between said second base plate and said diaphragm, said partition plate defining a fluid chamber in said elastic block cavity, and said diaphragm and said partition plate defining an auxiliary chamber, said fluid and auxiliary chambers being filled with a fluid and located on opposite sides of said partition plate;
first and second movable mechanisms incorporated with said partition plate and having first and second movable members, respectively, said first and second movable members being independent and separate from each other to be independently movable, each movable member having a first side in contact with the fluid in said fluid chamber, and a second side in contact with the fluid within said auxiliary chamber, said first and second members being movable through the fluid under first vibration in a first frequency range and restrained from movement through the fluid under a second vibration in a second frequency range which is lower than said first frequency range, said first vibration including first higher frequency vibration in a frequency range of from 250 Hz to 300 Hz, and a first lower frequency vibration in a frequency range of from 100 Hz to 170 Hz, said first movable member being movable under said first higher frequency vibration, said second movable member being movable under the first lower frequency vibration; and
means defining at least one orifice formed in said partition plate to establish fluid communication between said fluid and auxiliary chambers.

9. A fluid-filled power unit mount device as claimed in claim 8, wherein said at least one orifice is a first orifice.

10. A fluid-filled power unit mount device as claimed in claim 8, wherein said first vibration is smaller in amplitude than said second vibration.

11. A fluid-filled power unit mount device as claimed in claim 10, wherein said partition plate and diaphragm are securely connected to said second base plate, in which said diaphragm is disposed between said partition plate and said second base plate.

12. A fluid-filled power unit mount device as claimed in claim 11, wherein said first and second movable members are first and second flexible diaphragm members, respectively, said first and second flexible diaphragm members being securely disposed within first and second openings, respectively, formed through said partition plate, each flexible diaphragm member having a first surface in contact with the fluid within said fluid chamber and a second surface in contact with the fluid within said auxiliary chamber.

13. A fluid-filled power unit mount device as claimed in claim 11, wherein said first and second movable members are first and second movable plates, respectively, said first and second movable plates being movable in first and second spaces, respectively, formed in said first partition plate, said space being communicable with said fluid chamber through a first hole which is closable with said first movable plate and with said auxiliary chamber through a second hole which is closable with said first movable plate, said second space being communicable with said fluid chamber through a third hole which is closable with said second movable plate and with said auxiliary chamber through a fourth hole which is closable with said second movable plate.

14. A fluid-filled power unit mount device as claimed in claim 13, wherein said first and second movable plates are disc-shaped, in which said first movable plate is larger in diameter than said second movable plate.

15. A fluid-filled power unit mount device as claimed in claim 14, wherein said at least one orifice includes a first orifice opened to said fluid chamber, and a second orifice opened to said auxiliary chamber.

16. A fluid-filled power unit mount device as claimed in claim 15, further comprising means defining a fluid flow passage within said partition plate, said fluid flow passage being communicated through said first orifice with said fluid chamber and communicated through said second orifice with said auxiliary chamber.

17. A fluid-filled power unit mount device as claimed in claim 15, wherein said fluid flow passsage is larger in cross-section than either of said orifice.

18. A fluid-filled power unit mount device as claimed in claim 11, wherein said first and second movable members are first and second plates, respectively, said first and second plates being movably disposed in first and second openings, respectively, formed through said partition plate, each movable plate having a first surface in contact with the fluid within said fluid chamber, and a second surface in contact with the fluid within said auxiliary chamber.

19. A fluid-filled power unit mount device as claimed in claim 18, wherein said at least one orifice defining means includes a pipe member carried by said second movable plate, said pipe having a cylindrical opening through which said fluid chamber and said auxiliary chamber are in communication with each other.

20. A fluid-filled power unit mount device as claimed in claim 19, wherein said first and second movable members are disc-shaped.

21. A fluid-filled power unit mount device as claimed in claim 20, further comprising first and second annular resilient members secured to inner surfaces of said first and second openings, in which each of said first and second movable plates includes a peripheral section securely connected to said first and second annular resilient members, respectively.

22. A fluid-filled power unit mount device as claimed in claim 20, wherein said first movable plate is smaller in diameter than said second movable plate.

23. A fluid-filled power unit mount device as claimed in claim 11, wherein said first and second movable members are first and second movable plates, respectively, said first and second plates being movably disposed in an opening formed through and a space formed in said partition plate, respectively, each movable plate having a first surface in contact with the fluid within said fluid chamber, and a second surface in contact with the fluid within said first auxiliary chamber.

24. A fluid-filled power unit mount device as claimed in claim 23, wherein said first movable plate is disc-shaped.

25. A fluid-filled power unit mount device as claimed in claim 24, further comprising an annular resilient member secured to an inner surface of said opening, in which said first plate includes a peripheral portion secured to said annular resilient member.

26. A fluid-filled power unit mount device as claimed in claim 23, wherein said space is communicated with said fluid chamber through a first hole which is closable with said second plate member, and with said auxiliary chamber through a second hole which is closable with said second plate member.

27. A fluid-filled power unit mount device as claimed in claim 26, wherein said opening is smaller in diameter than each of said first and second holes.

28. A fluid-filled power unit mount device comprising:
   an elastic block securely interposed between a power unit and a vehicle body and being formed therein with a cavity;
   a diaphragm connected to said elastic block;
   a partition plate connected to said elastic block and defining a fluid chamber in said elastic block cavity, and defining an auxiliary chamber between said elastic block cavity and said diaphragm, said fluid and auxiliary chambers being filled with a fluid and located on opposite sides of said partition plate;
   first and second movable mechanisms having respectively first and second movable members, at least one of said first and second movable mechanisms being incorporated with said first partition plate, said first and second movable members being in contact with the fluid within said fluid chamber and being independent and separate from each other to be independently movable, said first movable member being movable through the fluid under higher frequency vibration in a frequency range of from 250 Hz to 300 Hz, said second movable member being movable through the fluid under lower frequency vibration in a frequency range of from 100 Hz to 170 Hz; and
   means defining at least one orifice formed in said partition plate to establish fluid communication between said fluid and auxiliary chambers.

29. A fluid-filled power unit mount device comprising:
   first and second base plates which are spaced from each other and securely connected to a vehicle body and a power unit, respectively;
   an elastic block securely interposed between said first and second base plates and being formed therein with a cavity;
   a first diaphragm fixedly connected to said first base plate;
   a first partition plate fixedly connected to said first base plate, said first partition plate defining a fluid chamber in said elastic block cavity, and said first diaphragm and partition plate defining therebetween a first auxiliary chamber, said fluid and first auxiliary chambers being filled with a fluid and located on opposite sides of said first partition plate;
   a second diaphragm fixedly connected to said second base plate;
   a second partition plate fixedly connected to said second base plate, said second partition plate defining said fluid chamber in said elastic block cavity, and said second diaphragm and partition plate defining therebetween a second auxiliary chamber, said second auxiliary chamber being filled with the fluid and located on opposite sides of said partition plate from the fluid chamber;
   first and second movable mechanisms respectively incorporated with said first and second partition plates, said first and second movable mechanisms respectively having first and second movable members which are independent and separate from each other to be independently movable, each movable member having a first side in contact with the fluid chamber, and a second side in contact with the fluid in said auxiliary chamber, said first and second members being movable through the fluid under first vibration in a first frequency range and restrained from movement through the fluid under second vibration in a second frequency range which is lower than said first frequency range, said first vibration including first higher frequency vibration in a frequency range of from 250 Hz to 300 Hz, and a first lower frequency range of from 100 Hz to 170 Hz, said first movable member being movable under said first higher frequency vibration, said second movable member being movable under the first lower frequency vibration;
   means defining a first orifice in said first partition plate to establish fluid communication between said fluid and first auxiliary chamber; and
   means defining a second orifice in said second partition plate to establish fluid communication between said fluid and second auxiliary chamber.

* * * * *